United States Patent [19]

Wilcox

[11] Patent Number: 5,074,439
[45] Date of Patent: Dec. 24, 1991

[54] SCENT OR LURE DISPENSING DEVICE

[76] Inventor: Larry A. Wilcox, Rte. 9, Box 381, Shelbyville, Ind. 46176

[21] Appl. No.: 612,554

[22] Filed: Nov. 13, 1990

[51] Int. Cl.$^5$ .............................................. B67D 5/64
[52] U.S. Cl. ........................................ 222/175; 43/1; 206/38; 224/222; 239/36
[58] Field of Search ................... 222/175; 239/36, 60; 383/63; 206/0.5, 37, 38, 524.1; 224/222, 258; 43/1

[56] References Cited

U.S. PATENT DOCUMENTS

| | | | |
|---|---|---|---|
| 2,273,136 | 2/1942 | Orech et al. | 224/258 |
| 2,356,209 | 8/1944 | Brilhart | 224/258 |
| 2,959,354 | 11/1960 | Beck | 239/36 |
| 3,046,192 | 7/1962 | Bilyeu | 43/1 X |
| 3,702,677 | 11/1972 | Heffington | 206/0.5 X |
| 3,959,569 | 5/1976 | Burhkolder, Jr. | 427/195 X |
| 4,186,502 | 2/1980 | Foster | 36/136 |
| 4,186,786 | 2/1980 | Kirkpatrick | 383/63 |
| 4,319,679 | 3/1982 | Gustafsson | 206/0.5 |
| 4,362,198 | 12/1982 | Kemp | 383/63 |
| 4,506,806 | 3/1985 | Lincoln et al. | 222/175 |
| 4,682,715 | 7/1987 | Reeves | 222/175 |
| 4,722,477 | 2/1988 | Floyd | 239/36 |
| 4,735,010 | 4/1988 | Grinarml | 43/1 |
| 4,961,532 | 10/1990 | Tangney | 239/60 |

Primary Examiner—Kevin P. Shaver
Assistant Examiner—Joseph A. Kaufman
Attorney, Agent, or Firm—Woodard, Emhardt, Naughton, Moriarty & McNett

[57] ABSTRACT

A scent or lure dispensing device for hunters or trappers, comprising a moisture permeable and sealable container; moisture absorbent particles sealed within the container that are capable of absorbing and storing many times their weight in scent and lure moisture; an adjustable lanyard for removably securing the container to hunters and trappers; and a sealable, odor-tight and liquid-tight storage compartment for receiving the container and the liquid scents and lures to be absorbed and stored by the moisture absorbent particles.

5 Claims, 1 Drawing Sheet

SCENT OR LURE DISPENSING DEVICE

BACKGROUND OF THE INVENTION

The present invention relates generally to the field of hunting and trapping, and more particularly is concerned with a hunters' and trappers' scent or lure dispensing device.

Hunters and trappers are known to use liquid scents or lures to mask their own scents or to lure prey. Such scents and lures are typically deposited on the ground of into the air by some means as the hunters and trappers walk. However, known means of depositing such scents and lures have proven to make unacceptably inefficient use of liquid scents and lures in light of the high prices now commanded for even small amounts of the most desirable scents and lures.

SUMMARY OF THE INVENTION

The preferred embodiment of the present invention places moisture absorbent particles inside a fabric bag that is removably attachable to a hunter's or trapper's boot by a lanyard secured to the fabric bag. When not in use, the fabric bag is stored in a sealed, odor-tight and liquid-tight storage bag into which a liquid scent or lure is introduced. The moisture absorbent particles within the fabric bag will absorb a certain amount of scent or lure moisture present within the storage bag, thereby "charging" the particles and readying the scent bag for use by the hunter or trapper. In use, the fabric bag drags behind the hunter's or trapper's boot while walking, depositing the scent or lure slowly emanating from the moisture absorbent particles through the fabric bag into the air and unto the ground behind the hunter or trapper. A small amount of liquid scent or lure will "recharge" the moisture absorbent particles within the fabric bag many times over when the fabric bag is stored within the storage bag when not in use.

Another embodiment of the present invention is a scent or lure dispensing device for hunters or trappers, comprising a moisture permeable and sealable container; moisture absorbent particles sealed within the container that are capable of absorbing and storing many times their weight in scent and lure moisture; and means for removably securing the container to hunters and trappers.

Another embodiment of the present invention is a scent or lure dispensing device for hunters or trappers, comprising a moisture permeable and sealable container; moisture absorbent particles sealed within the container that are capable of absorbing and storing many times their weight in scent and lure moisture; means for removably securing the container to hunters and trappers; and a sealable, odor-tight and liquid-tight storage compartment for receiving the container and the liquid scents and lures to be absorbed and stored by the moisture absorbent particles.

An object of the present invention is to provide a means and method of efficiently dispensing costly hunters' and trappers' scents and lures.

Related objects and advantages of the present invention will be apparent from the following description.

DESCRIPTION OF THE PREFERRED EMBODIMENT

Figure 1:
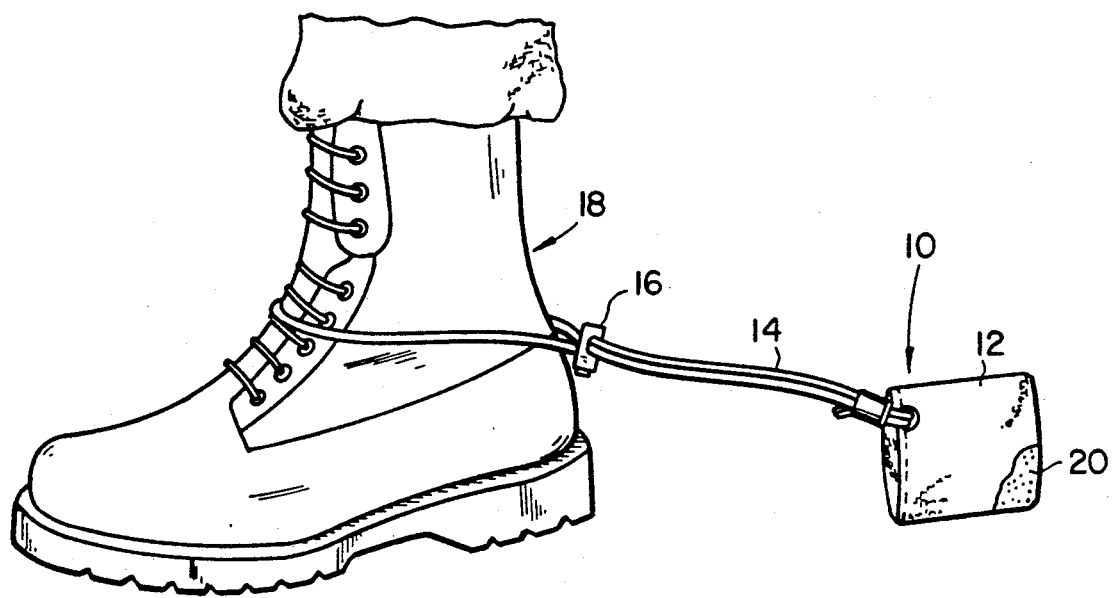
FIG. 1 is a perspective and partially segmented view of a preferred embodiment of the scent or lure device of the present invention removably attached to the boot of a hunter or trapper.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, there is shown in FIG. 1 a scent or lure device 10 of the preferred embodiment removably secured about the ankle of a hunter's or trapper's boot 18. The preferred embodiment of the scent or lure device 10 of the present invention is composed of a moisture permeable fabric bag 12 that has been sealed about its periphery by conventional stitching, or the like, to enclose therein moisture absorbent particles 20. Attached to fabric bag 12 is a lanyard 14 fitted with an adjustable stop 16 to permit lanyard 14 to be removably attached to the ankle area of a hunter's or trapper's boot 18 a sufficient distance away therefrom to permit fabric bag 12 to drag upon the ground behind the hunter or trapper as the hunter or trapper walks.

Moisture absorbent particles 20 of the preferred embodiment are dry, crystal-like superabsorbent polymers that are capable of absorbing and storing many times their weight in moisture, and that slowly release the moisture stored over time. Such known superabsorbent polymers are not soluble, and therefore do not change the nature of the moisture they absorb. They do, however, swell to resemble a gelatin-like substance as the dry particles absorb moisture. As the absorbed moisture evaporates or is extracted, the superabsorbent polymers return to their unswollen, dry, crystal-like state. In work completed to date, the preferred moisture absorbent particles 20 for use in the fabric bag 12 of the preferred embodiment have been dry, crystal-like particles of a synthetic acrylamide copolymer, having typical particle sizes between 1.0 mm. to 3.0 mm, that are capable of absorbing 300–400 times their weight in water. Such a product is commerically available from Industrial Services International, Inc., of Brandenton, Fla., identified by the trademark TERRA-SORB AG.

Figure 2:
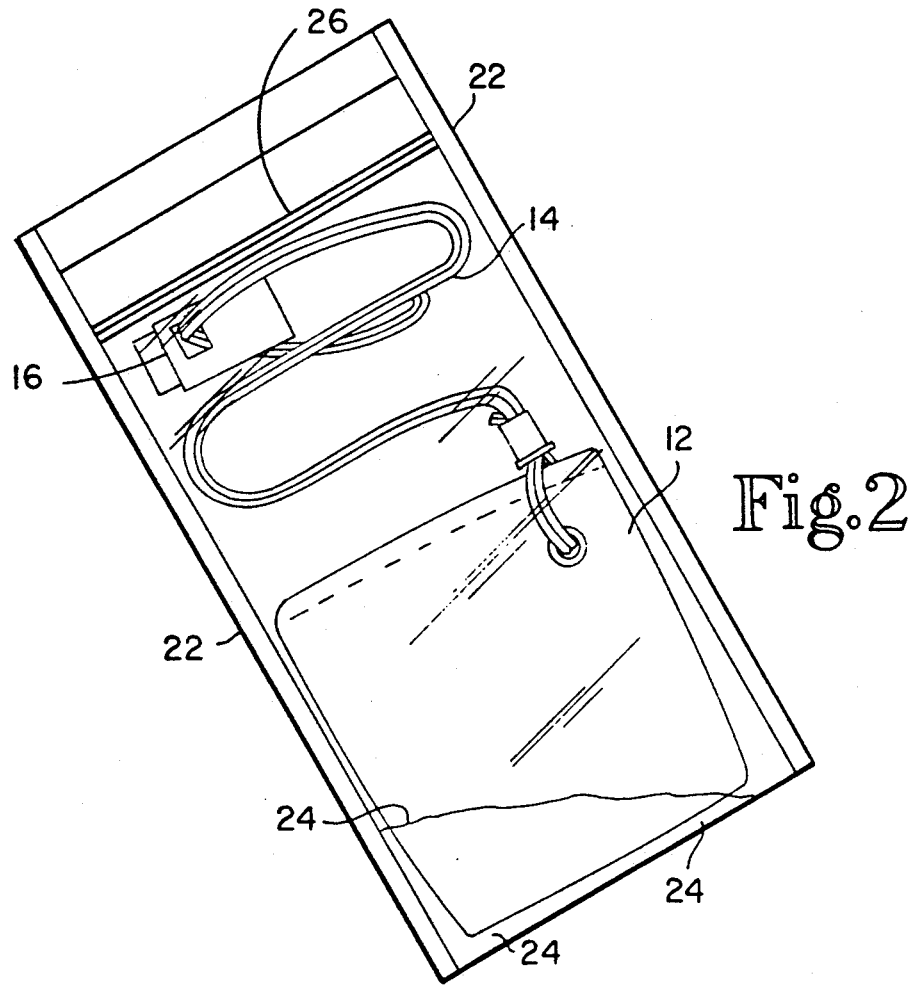
FIG. 2 is a perspective view of the scent or lure device of FIG. 1 stored within a sealable, odor-tight and liquid-tight clear plastic storage bag of the preferred embodiment.

Referring now to FIG. 2, the scent and lure device 10 of the preferred embodiment is stored in a sealable, odor-tight and liquid-tight plastic storage bag 22 when not in use by the hunter or trapper. Liquid scent or lure is added to the storage bag 22, which is then sealed along resealing strip 26. After about 30 minutes, moisture absorbent particles 20 within scent bag 12 will have absorbed a certain amount of the scent or lure moisture present in storage bag 22, the amount of which will have been determined by the weight amount of moisture absorbent particles 20 sealed within scent bag 12 and by the length of their exposure to the liquid scent or lure within storage bag 22.

In the preferred embodiment, the crystal-like moisture absorbent particles 20 will take on a gelatin-like consistency when they have absorbed scent or lure moisture, which can be detected by the hunter or trapper by palpating the absorbent particles 20 within fabric bag 12. When the moisture absorbent particles 20 lose all scent or lure moisture, they will return to their hard, dry, crystal-like consistency, signaling the need for exposure to additional liquid scent or lure, which again can be detected by the hunter or trapper by palpating the absorbent particles 20 within fabric bag 12.

In tests completed to date, the moisture absorbent particles 20 of the preferred embodiment have held scent or lure moisture for several days when re-sealed within storage bag 22 after use. The scent or lure moisture lost has been slowly released from the moisture absorbent particles 20, and through fabric bag 12 into the air and onto the ground behind the hunter or trapper when in use as shown in FIG. 1. The controlled use of liquid scent and lure provided by the scent and lure device 10 of the present invention, when used in the manner disclosed, allows for a more efficient use of expensive scents or lures than previously known in the prior art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A scent or lure dispensing device for hunters or trappers, comprising:
    a moisture permeable and sealable fabric bag container;
    moisture absorbent particles sealed within said container that are composed of dry, superabsorbent polymers capable of absorbing and storing many times their weight in scent and lure moisture and that swell to resemble gelatin-like substances as they absorb and store moisture, and that return to a dry, unswollen state as absorbed and stored moisture is extracted or evaporates; and
    means for removably securing said container to hunters and trappers.

2. The scent or lure dispensing device of claim 1 wherein said moisture absorbent particles are composed of a synthetic acrylamide copolymer having particle sizes of about 1 to 3 millimeters and that are capable of absorbing about 300-400 times their weight in water moisture.

3. The scent or lure dispensing device of claim 1 wherein said means for removably securing said fabric bag to hunters and trappers includes a lanyard.

4. The scent or lure dispensing device of claim 3 wherein said lanyard is fitted with an adjustable stop to permit said lanyard to be removably attached to the footwear of hunters and trappers.

5. The scent or lure dispensing device of claim 1 and further comprising a sealable, odor-tight and liquid-tight storage bag for receiving said container and the liquid scents and lures to be absorbed and stored by said moisture absorbent particles.

* * * * *